(12) United States Patent
Ciudaj

(10) Patent No.: US 7,527,711 B2
(45) Date of Patent: May 5, 2009

(54) PROCESS AND STRUCTURE FOR SUPERACCELERATING NATURE, PRODUCING A CONTINUOUS SUPPLY OF FRESH WATER FROM SALT WATER BY USING SOLAR, WIND, AND WAVE ENERGY

(75) Inventor: Jeffrey Ciudaj, Angwin, CA (US)

(73) Assignee: Desal, LLC, Angwin, CA (US)

( * ) Notice: Subject to any disclaimer, the term of this patent is extended or adjusted under 35 U.S.C. 154(b) by 810 days.

(21) Appl. No.: 10/977,408

(22) Filed: Oct. 29, 2004

(65) Prior Publication Data

US 2005/0067271 A1    Mar. 31, 2005

(51) Int. Cl.
*B01D 3/00* (2006.01)
*C02F 1/04* (2006.01)

(52) U.S. Cl. .............. 202/234; 159/16.1; 159/904; 159/DIG. 20; 203/10; 203/49; 203/100; 203/DIG. 1; 203/DIG. 17

(58) Field of Classification Search .......... 159/16.1, 159/904, DIG. 15, DIG. 20; 202/234, 185.3, 202/267.1; 203/10, 49, 86, 100, DIG. 1, 203/DIG. 17
See application file for complete search history.

(56) References Cited

U.S. PATENT DOCUMENTS

| | | | |
|---|---|---|---|
| 3,257,291 A | | 6/1966 | Gerber |
| 3,607,664 A * | | 9/1971 | Mascarello et al. ......... 202/180 |
| 4,035,243 A * | | 7/1977 | Katz et al. .................... 203/24 |
| 4,150,923 A | | 4/1979 | Wardman |
| 4,219,387 A * | | 8/1980 | Gruntman ................... 202/182 |
| 4,319,141 A * | | 3/1982 | Schmugge ................... 290/52 |
| 4,882,071 A * | | 11/1989 | Bench et al. ................ 210/747 |
| 5,316,626 A | | 5/1994 | Guy |
| 6,494,995 B1* | | 12/2002 | Battah ....................... 202/234 |
| 2008/0083604 A1* | | 4/2008 | Al-Garni et al. ............. 202/177 |
| 2008/0314058 A1* | | 12/2008 | Jones et al. ................. 62/235.1 |

FOREIGN PATENT DOCUMENTS

DE          2507593        6/2008

* cited by examiner

*Primary Examiner*—Virginia Manoharan
(74) *Attorney, Agent, or Firm*—Marc E. Hankin; Hankin Patent Law, APC

(57) ABSTRACT

A continuous supply of fresh water achieved through desalinization by a system of Venturi shafts to increase the velocity and pressure of air flow allowing for increased condensation and processing of evaporated water through a structure (1) that incorporates a blackened evaporation surface (16), concave Venturi wind walls (50), a vertical Venturi wind shaft (10), condensation chambers (5) connected by horizontally stacked hollow cylinders (61), a heat transfer duct (40) that draws cool air from a water body, vents hot air through an air exhaust port (48), and a water drainage port (35) that flows water to a reservoir (36).

14 Claims, 3 Drawing Sheets

PROCESS AND STRUCTURE FOR SUPERACCELERATING NATURE, PRODUCING A CONTINUOUS SUPPLY OF FRESH WATER FROM SALT WATER BY USING SOLAR, WIND, AND WAVE ENERGY

CROSS REFERENCE TO RELATED APPLICATIONS

This non-provisional United States (U.S.) Patent Application is a national stage application, which claims priority on International Application No. PCT/US03/13712 with International Filing Date Apr. 30, 2003 and Priority Date of May 2, 2002 by Jeffrey Ciudaj entitled "Process And Structure For Superaccelerating Nature, Producing A Continuous Supply Of Fresh Water From Salt Water By Using Solar, Wind, And Wave Energy"; which claims priority on U.S. Provisional Application No. 60/377,769 filed May 2, 2002 by Jeffrey Ciudaj entitled "Process And Structure For Superaccelerating Nature, Producing A Continuous Supply Of Fresh Water From Salt Water By Using Solar, Wind, And Wave Energy".

FIELD OF INVENTION

The invention relates to a water desalinization process and device.

BACKGROUND

The process of desalting water to create fresh water is not a new idea, it has been used for centuries by civilizations around the world. By boiling salt water and collecting the steam, the simplest of men could have fresh water from the oceans. Although the process has become much more refined, virtually all desalinization techniques require enormous amounts of energy, enormous amounts of labor in maintenance, and they all create, as a by-product, enormous amounts of concentrated brine pollutants that must be disposed of. With all of the requirements of energy and maintenance along with the problem of pollutants it has become costly to produce fresh water from seawater. Reverse osmosis has been an approach that utilizes a membrane that allows water to pass through with very little salinity. Even though membrane technology continues to improve, it will always require energy, maintenance, and waste disposal.

There is a long-felt need for a water desalinization device that uses only passive energy sources including solar, wind, and wave energy to deliver a continuous source of fresh water without any measurable waste product.

DISCLOSURE AND SUMMARY OF THE INVENTION

It is an object of this invention to produce fresh water using only passive energy sources including solar, wind, and wave energy. Another object of the invention is to harness and use passive energy sources to "Super Accelerate" the desalinization process. A further object of the invention is to generate continuous fresh water without using any source of generated energy, without the cost of labor or maintenance, and without any measurable waste product. It is another object of the invention to produce a steady source of fresh water with little additional cost beyond the construction of the device itself. Yet another object of the invention is to be built of concrete or similar material that will allow the structure of this invention to last for a long time.

These and other features, aspects, and advantages of the present invention will become better understood with regard to the following description, appended claims, and accompanying drawings.

DETAILED DESCRIPTION

The invention is a water desalinization device. The invention is designed to deliver a continuous supply of fresh water through desalinization of seawater.

Figure 1:
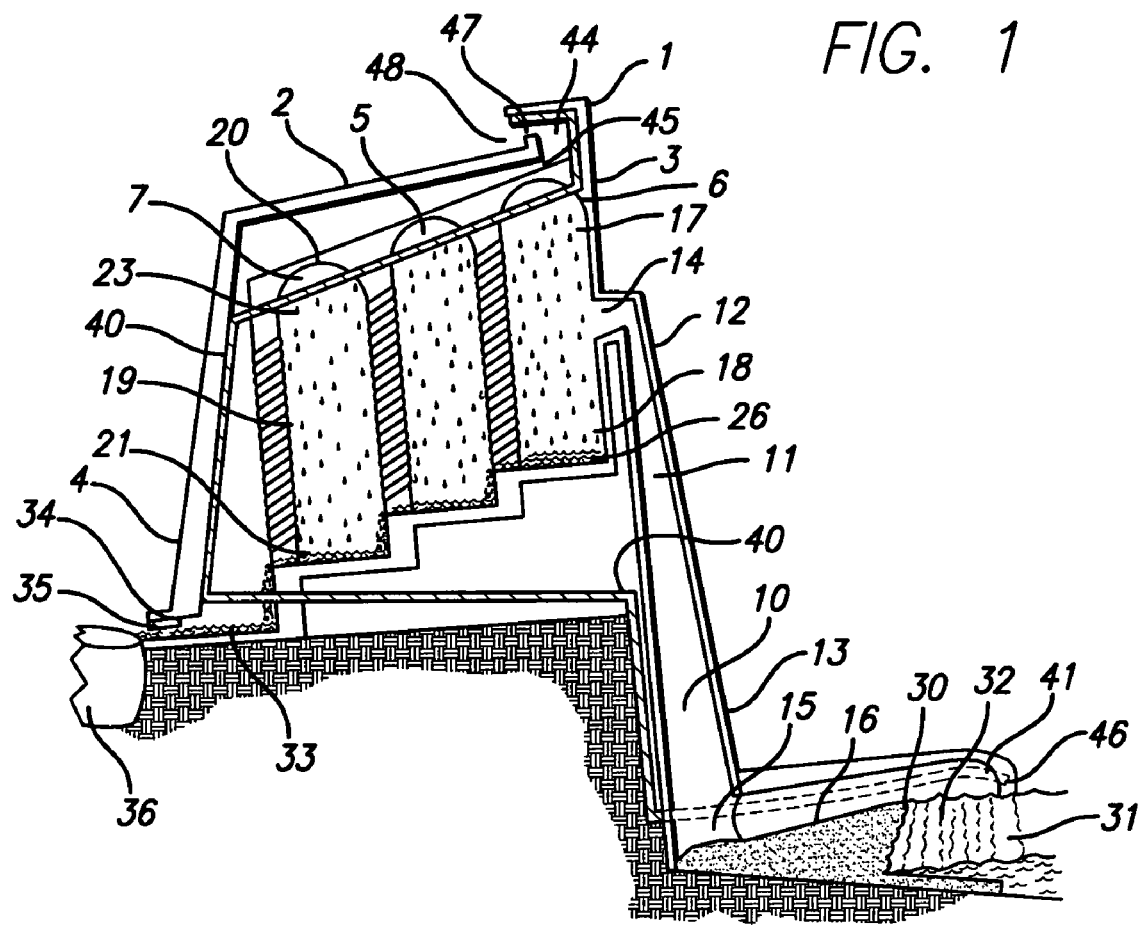
FIG. 1 is cross sectional view of the invention.
Figure 2:
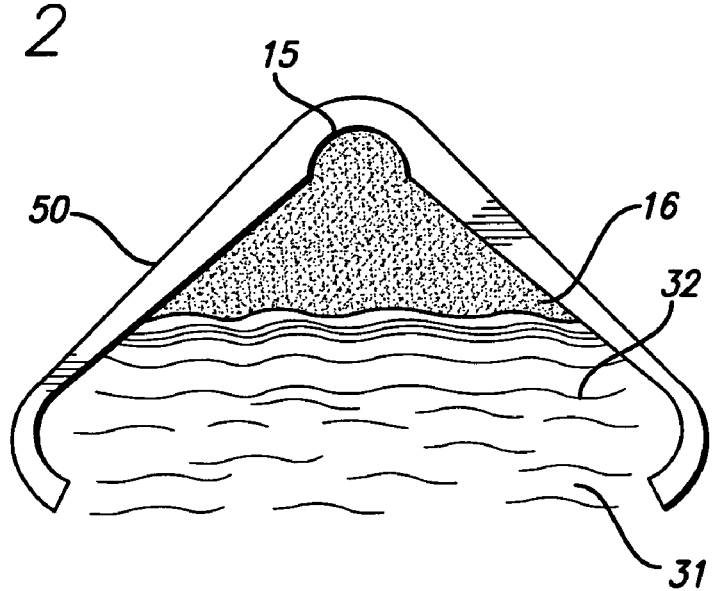
FIG. 2 is a top view of the blackened surface, wind walls and bottom shaft portion opening.

Referring now to FIG. 1, the invention 1 comprises a housing 2, preferably made of concrete, that has an upper zone 3 and a lower zone 4. Within the housing 2 are a series of interconnected chambers 5 with a first chamber 6 and a last chamber 7 in the series 5. The chambers are also preferably made of concrete.

A generally vertical wind shaft 10, preferably made of concrete, is shaped to create a Venturi effect 11 between the upper shaft portion 12 and the bottom shaft portion 13. The upper shaft portion 12 opens 14 into the first chamber 6 of the series 5 and the bottom shaft portion 13 opens 15 adjacent to the blackened surface 16. Each of the chambers of the series has an upper zone 17 and a lower zone 18, as well as a plurality of sides 19, a ceiling 20, and a bottom 21.

The sides 19 are formed with ribbed walls by the slip-form method, thus allowing the forms to be slipped up while the concrete mixture is poured down, thus allowing the chambers to be built quite large and tall, yet with increased strength. The water droplets that condensate on the sides 19 flow more easily through the folds in the sides and drip 23 to the lower zone 18 of the chamber.

The ceilings 20 of the chambers are textured, preferably in an egg-crate-like surface, in order to provide surfaces with increased surface area for water to condensate on and drip 23 to the lower zone 18 of the chamber. Each of the chambers has at least one upper temperature zone and at least one lower temperature zone, each of which may be of a different temperature from the other upper and lower temperature zones of the other chambers. The bottom of each chamber 21, located within the lower zone 18, is a water collection basin 26 to collect the water drips 23.

A blackened surface 16 is connected to the bottom shaft portion 13 and lies partially submerged 30 on the shore of a body of water 31. The blackened surface 16, preferably generally made of concrete and shore-like, through the absorption of solar energy, heats air and evaporates water as it is washed up onto the blackened surface by the wave action 32 of the water body 31.

The blackened surface 16 absorbs solar energy, creating a hot surface. The heat from the blackened surface 16 increases the evaporation of water from an external body of water 31, which is washed up on to the blackened surface 16. The blackened surface 16 also warms the air above the surface, causing the saturated air to rise up the vertical wind shaft 10 into the chambers 5-7.

A water drainage throughway 33 at the lower zone 18 and bottom 21 of the chamber has a termination end 34 with an exit port 35 and is designed to drain desalinized water from the basin 26 and out the exit port 35 using gravity. At least one water reservoir 36, which may also be made of concrete, is connected to the water drainage throughway exit port 35 and is designed to retain water, also by using gravity.

The heat transfer duct 40 has an influx portion 41 and an efflux portion 44 that undergoes a Venturi effect 45 as air leaves the structure. The influx portion 41 begins and opens 46 near the body of water 31 and serves as an air intake. The efflux portion 44 terminates and opens 47 at the air exhaust port 48 and expels warm air into the air exhaust port.

Referring now to FIGS. 2-5, FIG. 2 depicts the blackened surface 16 that is connected to the bottom shaft portion 13 and the bottom shaft portion opening 15. The blackened surface 16, preferably generally made of concrete or a combination of concrete and vinyl additives and shaped shore-like, is designed to be in contact with an external body of water 31, as waves 32 provide a constant supply of water to be evaporated and continuously clean the surface of salt residue.

Figure 3:
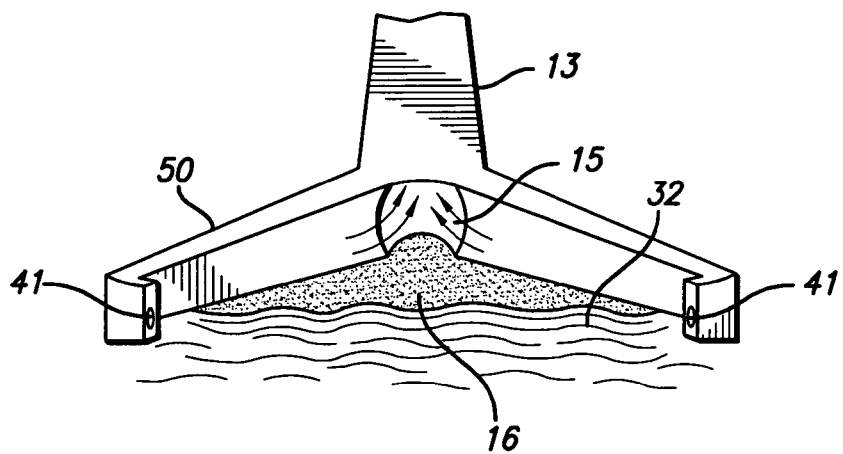
FIG. 3 is a perspective view of the blackened surface, wind walls, bottom shaft portion opening, and bottom shaft portion.
Figure 4:
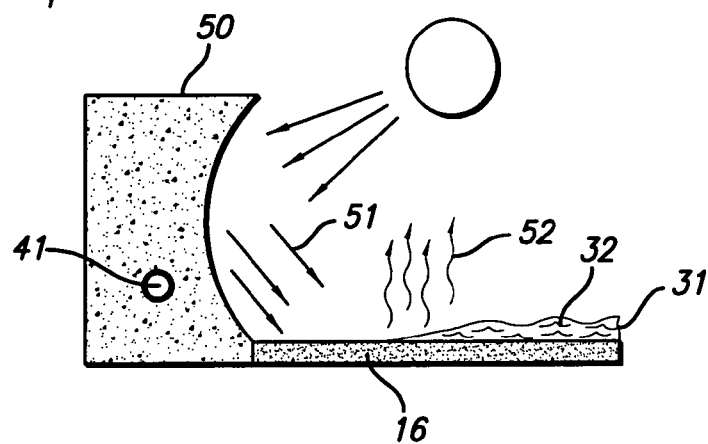
FIG. 4 depicts wind walls reflecting energy to the blackened surface.

Referring now to FIG. 3, depicted are the Venturi shaped concave wind walls 50, blackened surface 16, and the bottom shaft portion opening 15. The blackened surface 16 is designed to evaporate water generally into the bottom shaft portion opening 15. The concave wind walls 50, preferably white and made of concrete, are adjacent to the blackened surface 16, as seen in FIG. 4. The heat transfer duct influx 41 supply also can be seen here. The concave wind walls 50 are designed to be reflective surfaces to direct solar energy 51 to the blackened surface 16 to assist in water evaporation 52.

Figure 5:
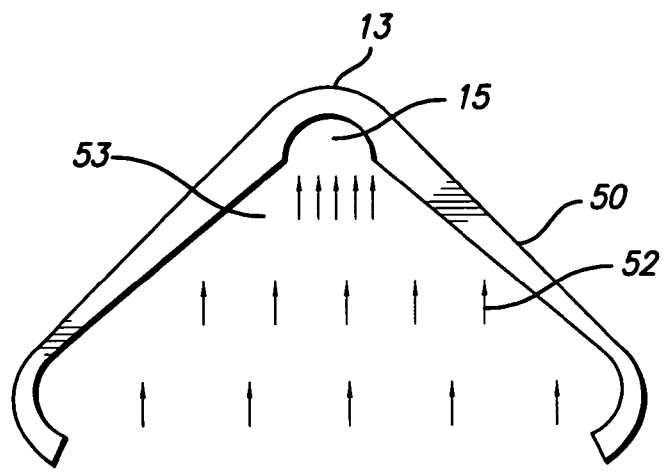
FIG. 5 depicts the Venturi effect channeling heated air and water vapor into the bottom shaft portion opening.

As seen in FIG. 5, the concave wind walls 50 also channel air and water vapor 52 towards the bottom shaft portion opening 15. The Venturi effect of the wind walls on the air movement increases the velocity and air pressure as slow moving air and water vapor moves towards the narrow end of the Venturi 53 from the bottom shaft portion opening 15 at the bottom shaft portion 13 thus becoming accelerated.

Figure 6:
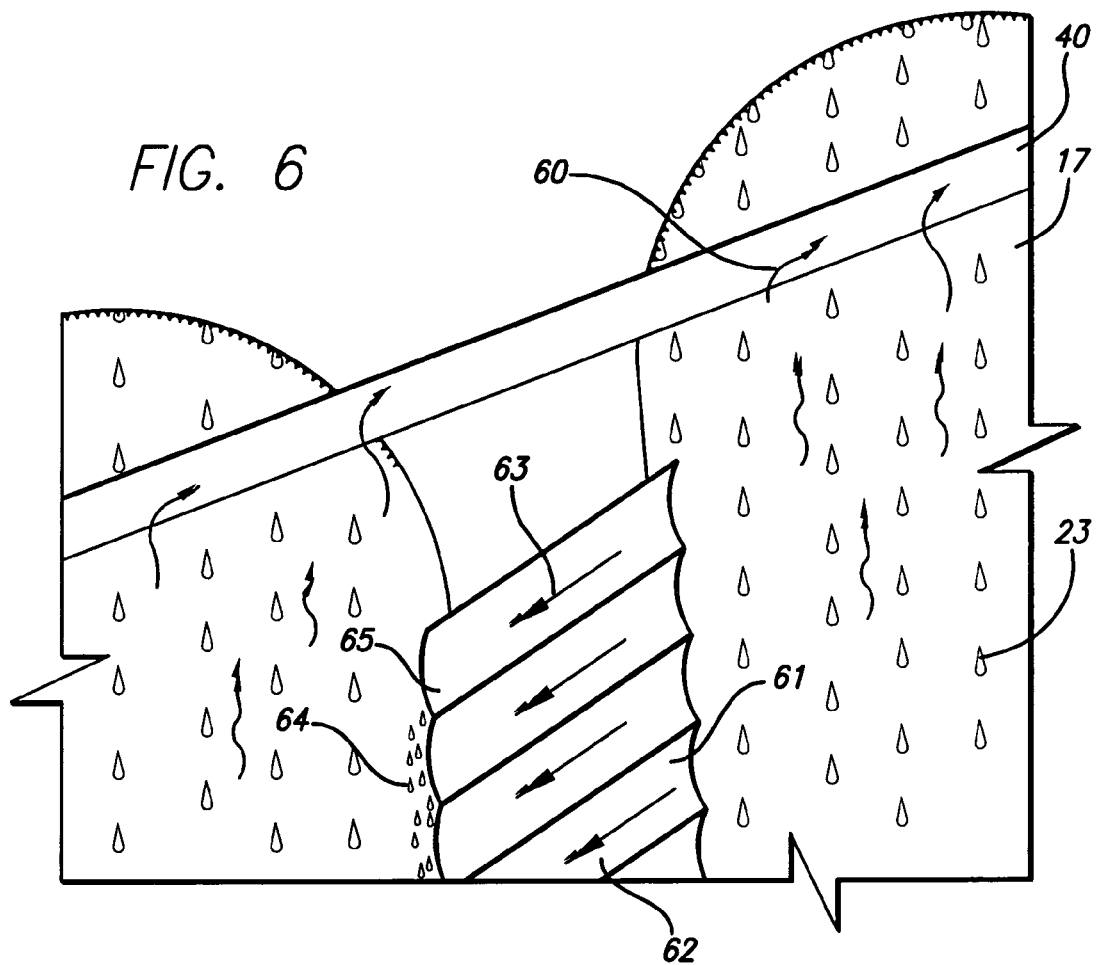
FIG. 6 depicts the heat transfer duct and the heat exchange to the heat transfer duct through the chamber upper zone, and the generally horizontal, stacked hollow cylinders.
Figure 7:
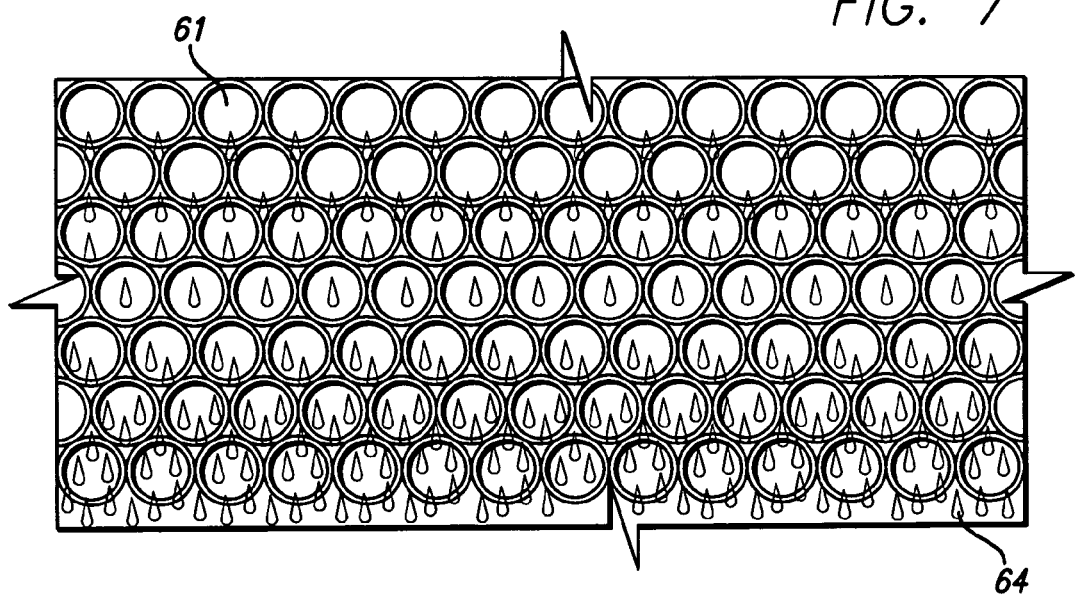
FIG. 7 depicts the generally horizontal stacked hollow cylinders with water droplets from condensation removing heat from air as it passes through the cascading droplets.

Referring now to FIGS. 6 and 7, FIG. 6 depicts heat rising 60 to the upper zone 17 of the chambers where it is absorbed by the heat transfer duct 40. This allows the cooler, water-laden air to condense on the egg-crate-like textured ceiling and drip down the folds in the walls, forming droplets 23 that fall to the basin 26 below. The horizontal hollow cylinders 61 are pitched slightly downward 62 in the direction of the airflow 63. The generally horizontally stacked hollow cylinders 61 direct air and water vapor 63 from one chamber to the next in the series 5 and allow water to drip 23 and drain to the basins 26 of the chambers. Condensation droplets 64 are shown flowing from the lower end 65 of the horizontal hollow cylinders 61.

Referring now to FIG. 7, the generally horizontally stacked hollow cylinders 61 downward pitch 62 allows water vapor to condensate and drip 64 through the directed air and water vapor 63 from the lower stacked hollow cylinders. This partial end view of horizontally stacked hollow cylinders 61 shows the cascade of water droplets 64 that removes heat, therefore cooling the warm air as it moves 63 through the cascade 64, allowing for increased condensation in the next chamber.

The invention housing 2, preferably made of concrete, may reach heights of hundreds of feet (possibly over sixty meters in height); the size and ratios of the invention components are site-dependent. The height should prohibit contamination of the chambers 5 by non-evaporated water, including salt water. The blackened surface 16 may be composed of blended concrete, including vinyl additives, for wear resistance.

As water from the body of water 31 washes up on the blackened surface 16, the evaporation rate is increased due to the solar energy being absorbed by the blackened surface 16 and the increased surface temperature of the blackened surface. Rising air through the Venturi shaft draws a breeze through the bottom shaft portion opening 15 from over the body of water 31. This draft pushes rising hot air and evaporated water to the narrow end of the Venturi of the concave wind walls 50. The curved ends of the concave wind walls 50 maximize the collection of air flows from any given direction from above the surface of the body of water 31 and to redirect said air flows into the concave wind wall Venturi 53.

The collected hot air and evaporated water are forced up the vertical Venturi wind shaft 10, causing an increase in air velocity and pressure. As hot air and evaporated water exits the vertical Venturi shaft 14 and enters the chambers there is a sudden decrease in air pressure. As the air flow slows and hot air rises to the upper zone of the chambers 17, the hot air surrounds the heat transfer duct 40 and heat is absorbed by the heat transfer duct 40.

The water in the air begins to condense on the textured concrete ceiling 20 and/or ribbed sides 19 of the chambers. As water droplets fall 23, they are collected in a basin 26 at the bottom 21 of the chambers. The collected water flows by way of the water drainage throughway 33 from chamber to chamber and exits the housing at the water drainage exit port 35 where water is channeled to at least one water reservoir 36.

As air pressure increases in the first chamber 6 it forces the water-laden air through the series of generally horizontal stacked hollow cylinders 61 connecting the first chamber 6 to the next chamber (and likewise subsequent chambers in the same manner) where the air will repeat the condensation cycle that occurred in the first chamber. As air passes through the stacked horizontal hollow cylinders 61, condensation collects along the inside walls of the cylinders. The cylinders are slightly pitched 62 towards the direction of the airflow 63 allowing all condensation to flow down and out of the cylinders into the next chamber. This creates a cascade effect of water flowing 64 from the ends of all the stacked, horizontal hollow cylinders 61.

As warm air passes slowly 63 through this cascade of droplets 64, it continues to cool, allowing for increased condensation rates in this next chamber. After the air has passed through the last, preferably third, chamber 7, it is drawn upward through the vertical Venturi exhaust shaft, and then at an angle over the tops of the chambers where it collects radiant heat from the preceding chambers, and then through at least one Venturi portion, and finally out the air exhaust port 48. Cool air from the surface of water body 31, preferably an ocean in a hot part of the world, enters the heat transfer duct 40 and provides cool temperatures that absorb the heat radiation into the heat transfer duct 40. This heat that is absorbed into the heat transfer duct 40 then radiates upwards through the duct and is released at the efflux portion drawing cooler air in behind it.

The previously described versions of the present invention have many advantages, including use of passive energy to generate fresh water with no measurable waste product. Thus, the problems that may be associated with previous attempts at desalinization are solved. It is important to note, however, that the invention does not equire that all these advantages need be incorporated into every embodiment of the invention.

Although the present invention has been described in considerable detail with reference to certain preferred embodiments thereof, other embodiments or versions are possible. Therefore, the spirit and scope of the appended claims should not be limited to the description of the preferred embodiments contained herein.

I claim:

1. A desalinization device to be used on the shore of a body of water, comprising:
   a. a housing;
   b. a series of interconnected chambers within said housing; said series of interconnected chambers having at least one first chamber and at least one last chamber in said series, with each of said series of interconnected chambers having at least one upper temperature zone and at least one lower temperature zone, each of which may be of a different temperature from other of said at least one upper temperature zones and said at least one lower temperature zones of other of said series of interconnected chambers;
   c. a generally vertical wind shaft connected to said housing, said shaft designed to create an at least one Venturi effect on an air entering said housing at a bottom shaft portion of said shaft, and said shaft having an upper shaft portion and said bottom shaft portion, said upper shaft portion having an opening into said at least one first chamber and said bottom shaft portion having an opening;
   d. each of said series of interconnected chambers having an upper zone and a lower zone, containing said at least one upper temperature zone and said at least one lower temperature zone and each of said series of interconnected chambers having a plurality of sides, a ceiling, and a bottom, said bottom is located within said lower zone and serves as a water collection basin;
   e. a blackened surface, wherein said blackened surface is heated by absorption of solar energy, wherein said blackened surface is connected to said bottom shaft portion and said opening of said bottom shaft portion, said blackened surface is in contact with an external body of water that washes over the blackened surface by wave action and said blackened surface absorbs solar energy and evaporates a water from said external body of water and heats said air, causing said air to rise causing said air to move into said opening of said bottom shaft portion;
   f. a water drainage throughway at said bottom of said lower zone of said series of interconnected chambers, said water drainage throughway having a termination end, and said water drainage throughway allows gravity to drain said water from said water collection basin;
   g. an air exhaust port connected to said last chamber of said series of interconnected chambers, said air exhaust port expels said air that has passed through said series of interconnected chambers and out of said last chamber and said housing and creates said at least one Venturi effect, as said air leaves said desalinization device roughly to match a velocity of said air entering said desalinization device; and
   h. at least one water reservoir, said at least one water reservoir connects to said termination end of said water drainage throughway and retains said water.

2. The desalinization device of claim 1, wherein said interconnected series of chambers have at least one interconnections, wherein said at least one interconnections comprise generally horizontally stacked hollow cylinders, said generally horizontally stacked hollow cylinders direct an air and water vapor, and said generally horizontally stacked hollow cylinders are pitched at an angle to allow said water to drip and drain into said water collection basin of said series of interconnected chambers.

3. The desalinization device of claim 2, wherein said horizontally stacked hollow cylinders allow a condensed water vapor to drip through said directed air and water vapor in order to cool said directed air and water vapor by removing heat from said air as it passes through a cascade of droplets of said condensed water vapor.

4. The desalinization device of claim 1, wherein said plurality of sides and said ceiling comprise a textured surface, said textured surface provides an increased surface area on which said water vapor condenses.

5. The desalinization device of claim 1 further comprising a heat transfer duct with an influx located above a surface of said body of water and positioned to intake said air without heating said air prior to said influx and an efflux located near said air exhaust port and a body that runs though said housing collecting radiant heat.

6. The desalinization device of claim 1 further comprising a plurality of concave wind walls adjacent to said blackened surface, said plurality of concave wind walls are reflective surfaces to direct energy to said blackened surface and further channel said water vapor into said opening of said bottom shaft portion.

7. The desalinization device of claim 6 wherein said plurality of concave wind walls have curved ends to maximize collection of a plurality of air flows from any given direction from above said surface of said body of water and to redirect said plurality of air flows into said plurality of concave wind walls creating said at least one Venturi effect and to said generally vertical wind shaft connected to said housing.

8. The desalinization device of claim 1 wherein said housing, said chamber, said generally vertical wind shaft, said plurality of concave wind walls, and said blackened surface are comprised of concrete.

9. The desalinization device of claim 8 wherein said generally vertical wind shaft, said plurality of concave wind walls, and said blackened surface are comprised of concrete with vinyl additives.

10. The desalinization device of claim 1 wherein said water drainage throughway further comprises an exit port.

11. A desalinization device, comprising:
   a. a housing, said housing with an upper zone and a lower zone;
   b. a series of interconnected chambers within said housing; said series of interconnected chambers having at least one first chamber and at least one last chamber in said series of interconnected chambers;
   c. a generally vertical wind shaft connected to said housing, said generally vertical wind shaft creates a Venturi effect, and said generally vertical wind shaft having an upper shaft portion and a bottom shaft portion, said upper shaft portion having an opening into said at least one first chamber and said bottom shaft portion having an opening, said opening of said bottom shaft portion is larger than an opening at a top of the generally vertical wind shaft;
   d. each of said series of interconnected chambers having an upper zone and a lower zone, and each said series of interconnected chambers having a plurality of sides, a ceiling, and a bottom, said ceiling has a texture, said texture provides a surface for a water to condensate on, and said plurality of sides are ribbed to allow a plurality of water droplets formed by condensation of said water to run down said sides, and said bottom is located within said lower zone and serves as a water collection basin;

e. a blackened surface, said blackened surface is connected to said bottom shaft portion and said bottom shaft portion opening, said blackened surface is in contact with an external body of water and said blackened surface absorbs solar energy and evaporates said water from said external body of water and heats an air, causing said air to rise and move into said opening of said bottom shaft portion;

f. a water drainage throughway, said water drainage throughway is located at said bottom of said series of interconnected chambers and is at said lower zone of said series of interconnected chambers, said water drainage throughway having a termination end, said termination end having an exit port, and said water drainage throughway allows gravity to drain said water from said water collection basin and delivers said water to said exit port;

g. a vertical Venturi exhaust shaft connected to said at least one last chamber in said series of interconnected chambers, said vertical Venturi exhaust shaft directs and expels said air that has passed though said series of chambers out of said at least one last chamber and said housing and causes said Venturi effect forcing said air upward and over a plurality of tops of said series of interconnected chambers to collect a radiant heat, and expel said radiant heat though an air exhaust port located at a top of said housing;

h. at least one water reservoir, said at least one water reservoir is connected to said water drainage throughway and wherein said at least one water reservoir retains said water;

i. a plurality of generally horizontally stacked hollow cylinders, said generally horizontally stacked hollow cylinders direct an air and water vapor, said generally horizontally stacked hollow cylinders are pitched at an angle to allow said water to drip and drain to said water collection basin of said series of interconnected chambers and allow a condensed water vapor to drip though said directed air and water vapor in order to cool said directed air and water vapor by removing heat from said air as it passes though a cascade of droplets of said condensed water vapor;

j. a plurality of concave wind walls adjacent to said blackened surface, said plurality of concave wind walls are reflective surfaces to direct an energy to said blackened surface and to channel said water vapor into said opening of said bottom shaft portion; and, k. said plurality of concave wind walls having curved ends to maximize collection of a plurality of air flows from any given direction from above said surface of said body of water and to redirect said plurality of air flows into said plurality of concave wind walls causing said Venturi effect and redirect to said generally vertical wind shaft connected to said housing.

12. The desalinization device of claim 11 further comprising a heat transfer duct with an influx located above said surface of said body of water and said influx positioned to intake said air without heating said air prior to influx and an efflux located near said air exhaust port and a body that runs though said desalinization device collecting radiant heat.

13. The desalinization device of claim 11 wherein said housing, said series of interconnected chambers, said generally vertical wind shaft, said plurality of concave wind walls, and said blackened surface are comprised of concrete.

14. The desalinization device of claim 11 wherein said generally vertical wind shaft, said plurality of concave wind walls, and said blackened surface are comprised of concrete with vinyl additives.

* * * * *